United States Patent
Hefner et al.

(10) Patent No.: US 6,239,250 B1
(45) Date of Patent: May 29, 2001

(54) HOT MELT ADHESIVES PRODUCED FROM LINEAR ALTERNATING POLYKETONES

(75) Inventors: John Guinn Hefner, Schnecksville; Lloyd Mahlon Robeson, Macungie, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/293,002

(22) Filed: Apr. 16, 1999

(51) Int. Cl.$^7$ ................................................ C08G 67/00
(52) U.S. Cl. ..................... 528/392; 525/185; 428/460; 428/461; 428/523; 428/524
(58) Field of Search ................................. 528/392, 185; 428/460, 461, 523, 524

(56) References Cited

U.S. PATENT DOCUMENTS

| | | | |
|---|---|---|---|
| 4,804,738 | 2/1989 | Drent | 528/392 |
| 4,871,618 | 10/1989 | Kinneberg et al. | 428/461 |
| 4,960,865 | 10/1990 | Blytas et al. | 528/499 |
| 4,970,294 | 11/1990 | Drent et al. | 528/392 |
| 5,019,645 | 5/1991 | Wong et al. | 528/488 |
| 5,209,983 | 5/1993 | Case et al. | 428/514 |
| 5,334,443 | 8/1994 | Goswami et al. | 428/261 |
| 5,554,777 | 9/1996 | Hefner et al. | 556/21 |
| 5,684,080 | 11/1997 | Heide et al. | 524/502 |

FOREIGN PATENT DOCUMENTS

| | | |
|---|---|---|
| 0320049 | 11/1988 | (EP) . |
| 648801 | 6/1994 | (EP) . |
| 0926200 | 12/1998 | (EP) . |
| 05017735 | 1/1993 | (JP) . |
| 09031436 | 2/1997 | (JP) . |
| 09031437 | 2/1997 | (JP) . |
| 9118043 | 11/1991 | (WO) . |
| 9318108 | 9/1993 | (WO) . |
| 9828354 | 9/1998 | (WO) . |

OTHER PUBLICATIONS

Beach, D. L., et al, *Encyclopedia of Polymer Science and Engineering*, vol. 6, p. 410, John Wiley & Sons (1987).

Drent, E., et al, *Journal of Organometallic Chemistry*, 417, "Efficient Palladium Catalysts for the Copolymerization of Carbon Monoxide With Olefins to Produce Perfectly Alternating Polyketones", pp. 235–251, Elsevier Sequoia S.A., (1991).

Sen, A., et al, *Inorganic Chem*, 23, "Mechanism of Palladium (II)–Catalyzed C+C Bond Isomerization in Olefins", pp. 3257–3258, (1984).

Zhao, A. X., et al, *Journal of Polymer Science*, Part A, vol. 30, "Palladium Catalyzed Ethylene—Carbon Monoxide Alternating Copolymerization", pp. 2735–2747, John Wiley & Sons (1992).

*Primary Examiner*—Duc Truong
(74) *Attorney, Agent, or Firm*—Mark L. Rodgers

(57) ABSTRACT

Olefin/CO linear alternating copolymers which are useful in hot melt adhesive applications are disclosed. The linear alternating copolymers have melting points ranging from 50 to 165° C. and exhibit a combination of properties which are desired for hot melt adhesives. Single olefins or combinations of olefins ranging from ethylene to $C_{12}$ olefins can be used to form the linear alternating copolymer.

15 Claims, No Drawings

HOT MELT ADHESIVES PRODUCED FROM LINEAR ALTERNATING POLYKETONES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

With the increased emphasis on environmentally acceptable materials, solvent based adhesives have been rapidly replaced with either water-borne adhesives or hot melt adhesives (100% solids). Hot melt adhesives are comprised of thermoplastic polymers that generally maintain a level of mechanical load bearing capability up to near the flow temperature. These materials are generally crystalline polymers, however, block copolymers with a glass transition above room temperature are also employed. The hot melt adhesives are often highly formulated materials with tackifiers, plasticizers, waxes, resins, terpene resins, and the like, added to balance the processing and adhesive properties desired for the material. Important desired properties include low temperature flexibility, excellent adhesive strength, wettability, low viscosity and high stability at processing temperatures. Other desired properties include water resistance, adhesion to a wide variety of substrates, ability to accept a wide variety of modifications, open time and set time. In processing, open time, i.e., the time that the material is fluid such that the material can penetrate the substrate, is important as is the set time (the time required for a material to go from the fluid state to a solid state—often related to crystallization kinetics). Fast set times are required for high speed equipment. Low viscosity is required so that conventional equipment can be used to apply a very thin film or bead of material to the substrates to be bonded. Hot melt adhesives are generally applied between 150 and 190° C. with viscosities of from 500 to 10,000 mPa-s and are expected to be stable for up to 24 hours at the application temperature.

The typical polymers utilized for hot melt adhesive applications include polyethylene, ethylene copolymers such as ethylene-vinyl acetate copolymers or ethylene-acrylic acid copolymers, polyesters, polyamides and styrene-butadiene-styrene block copolymers as well as their hydrogenated versions. As hot melt adhesives are continuing to replace the solvent based adhesives as well as other adhesive systems, e.g., reactive systems, additional materials are desired to meet the increasing demands for adhesive applications.

Hot melt adhesives based on olefin copolymers have been well documented in the patent literature for high pressure olefin copolymerization systems. These include ethylene copolymers with polar monomers such as vinyl acetate, acrylic acid, methyl acrylate, ethyl acrylate, mixed acrylates as well as ethylene terpolymers based on ethylene/polar monomer/carbon monoxide compositions.

JP 09031436 and JP 09031437 disclose hot melt adhesives comprised of copolymers of ethylene, CO, and unsaturated carboxylic acid esters combined with tackifier resins and waxes. EP 648801 notes a terpolymer of ethylene/alkyl acrylate/carbon monoxide as an adhesive for bonding furniture. WO 9318108 notes the use of CO containing ethylene co-and terpolymers in hot-melt adhesive formulations. Hot melt adhesives with good adhesion to various polymers based on ethylene/acrylates/CO terpolymers with hydrocarbon elastomers and tackifying resins were noted in JP 05017735.

Hot melt adhesives comprising ethylene terpolymers with CO or $SO_2$ units along with tackifiers, plasticizers and waxes are noted in WO 9118043. U.S. Pat. No. 5,209,983 notes a blend of PVC, an ethylene/n-butyl acrylate/CO terpolymer and an ethylene/n-butyl acrylate/glycidyl methacrylate terpolymer is useful for bonding PVC to wood or other substrates for exterior use. U.S. Pat. No. 4,640,865 notes the use of a carbon monoxide containing polymer with a coating layer of a halogenated polymer as a heat sealable material useful for packaging. The ethylene co- and terpolymers noted above containing carbon monoxide were all polymerized using high pressure polyethylene polymerization procedures. These polymers are synthesized by a high pressure, free radical polymerization procedure that yields branched polymers. In the case of copolymers, the composition along the chain is random and the overall composition of the chain is based upon the reactivity ratio of the comonomer with ethylene. High pressure polyethylene homopolymer is typically 105–115° C. whereas linear polyethylene has a melting point of 134° C. (D. L. Beach and Y. V. Kissin; in Encyclopedia of Polymer Science and Engineering, Vol. 6, p. 410, John Wiley & Sons, New York, 1987). With the incorporation of comonomers such as n-butyl acrylate, acrylic acid, ethyl acrylate, vinyl acetate, and carbon monoxide, the melting point decreases rapidly and with levels of 10 wt % and more the melting points are generally below 100° C. Compositions utilized for hot melt adhesives generally contain high amounts of comonomers and exhibit melting points well below 100° C.

Olefin/CO alternating copolymers have been achieved using transition metal (palladium) catalysts for polymerization, see Drent, et al., J. Organometallic Chem., 417, 235(1991)). Ethylene/carbon monoxide copolymers have a melting point of 260° C. Copolymers with minor amounts of propylene are employed to lower the melting point to increase the processability window as ECO copolymers have limited stability above 260° C.

Several methods for preparing suitable catalyst compositions for the copolymerization of olefins with carbon monoxide to prepare linear alternating polyketones have recently been described in both patent and academic literature. Compositions may consist of a nickel salt, such as Ni(II) cyanide, in the presence of an anhydrous solvent. Numerous examples utilizing a Pd(II) salt with a strong organic acid in the presence of a bidentate chelating ligand which bonds in in cis geometry to Pd and optionally an oxidant have been disclosed. For example, U.S. Pat. No. 4,804,738 describes the use of Pd(II) acetate with at least 2 equivalents of trifluoroacetic acid and 1,3-bis(diphenylphosphino)propane to generate an active catalyst composition with or without a quinone, such as 1,4-benzoquinone, to increase catalyst mileage. Most polymerizations with acid promoted catalysts are performed in methanol as the reaction diluent which also serves as a telogen. One limitation apparent with acid promoted Pd(II) catalyst systems is the very low relative reactivity of $C_3$ branched or higher aliphatic olefins relative to ethylene in solvents such as alcohols. Very low efficiencies and molecular weights are generally obtained for the polymers from such polymerizations. For example, U.S. Pat. No. 4,970,294 contains an example (Example 8) in which a mixture consisting of propylene and carbon monoxide was copolymerized in a composition consisting of palladium(II) acetate, methanol (solvent), copper para-tosylate and 1,3- bis(diphenylphosphino)propane. The reported polymerization rate was 0.3 kg copolymer/g palladium hour. The polymer had an average molecular weight in the range of about 1000 to 2000.

Recently described dicationic complexes which are substantially acid and alcohol free in the reaction composition are capable of producing polymers containing one or more olefins of C3 carbon atoms or higher with carbon monoxide at much higher overall rates and efficiencies than previously known. Generally the compositions consist of a transition metal source, such as Pd(II), which contains weakly or non-coordinating anions, a cis coordinating bidentate donor ligand and a telogen such as methanol. Examples of such catalysts have been disclosed by A. Lai Sen, T-W Inorg. Chem. (1984), 23, 3257–3258, and coworkers for the complex $[Pd(CH_3CN)_{4-n}\cdot(nPPh_3)]$ $(BF_4)_2$ (n=1–3), J. C. W. Chien, T. C. W, *J. Poly. Sci: Part A, Poly. Chem.*, Vol. 30, 2735–2747 (1992), and coworkers improved the stability of the Sen system by addition of a cis chelating bidentate phosphine for the complex $[PPh_2CH_2\ CH_2\ CH_2PPh_2)Pd(CH_3CN)_2](BF_4)_2/CH_3OH$ and a series of cationic complexes have been reported in U.S. Pat. No. 5,554,777 based on the general formula $(Pd(II)S_{4-x}L_x)^{+2}(A)^{-n}{}_y$, where S is a synthesis solvent, L is a mono- bi- or tri-dentate ligand, x is an integer from 1 to 3, A is a weakly or non-coordinating anion and n is 1 or 2 and y is 2 or 1.

Kinneberg and Armer (U.S. Pat. No. 4,871,618) note the use of a linear alternating copolymer of carbon monoxide and at least one ethylenically unsaturated hydrocarbon with a structure such that ethylene comprises at least 66 mole % of the ethylenically unsaturated hydrocarbon with melting points of>175° C. der Heide, et al. (U.S. Pat. No. 5,684,080) discuss an aqueous emulsion of a carbon monoxide copolymer with an olefinically unsaturated hydrocarbon and a curing agent composition which can be utilized for a wood adhesive. The examples note a propylene/carbon monoxide alternating copolymer of low molecular weight. U.S. Pat. No. 5,334,443 notes an adhesion promoting film composed of PVC and a low molecular weight carbon monoxide/propylene copolymer for coated fabrics. The utility of the alternating copolymers of olefins and carbon monoxide for hot melt adhesives has not been recognized in the open or patent literature.

BRIEF SUMMARY OF THE INVENTION

We have found that olefin/CO linear alternating copolymers having a melting point from 50° to 165° C. can be used to make formulations which exhibit a combination of properties which are desired for hot melt adhesives. Single olefins or combinations of olefins ranging from ethylene to $C_{12}$ olefins, specifically selected to achieve the desired properties, can be used to form the linear alternating copolymers. The tacticity of the olefin/CO alternating units is important and compositions from substantially atactic to structures which are partially isotactic or optionally syndiotactic are contemplated in this invention.

DETAILED DESCRIPTION OF THE INVENTION

The present invention is an improved class of hot melt adhesive formulations. The holt melt adhesive formulations of the present invention are formed from olefin/CO linear alternating copolymers. As used herein, the term "linear alternating copolymer" refers to copolymers having CO alternating with one or more olefin groups wherein at least 95% of the polymer linkages are linear. The olefins used to form the linear alternating copolymer can be selected to achieve the specific desired properties of the resultant hot melt adhesive formulation and can range from a single olefin, such as propylene, to combinations of olefins, ranging from ethylene to $C_{12}$ olefins. In selecting the olefin, or combinations of olefins, it is important that the resulting copolymer have a melting point from 50° to 165° C. in order to be suitable in forming a hot melt adhesive.

We have found that a propylene/CO linear alternating copolymer, is especially well suited for forming hot melt adhesives.

An important aspect of the invention is controlling the tacticity (thus crystallinity) of the polymer with respect to branched olefin insertion. One important reason for increasing the crystallinity would be to enhance the cohesive strength of the polymer. Another reason for increasing polymer tacticity or crystallinity would be to provide for higher temperature performance than the amorphous analogues, such as atactic propylene/carbon monoxide. This would provide some additional thermal resistance to bond failure at elevated temperatures. For some applications it may be desirable to maintain some degree of crystallinity in the polymer chain in order to increase the modulus of the copolymer in applications where high cohesive strength is required, as well.

Polymer Synthesis

Polymers of the current invention were prepared by reacting together a source of palladium in the form of a Pd(II) salt consisting of one or two anions, optionally a synthesis solvent, bidentate chealating ligand, optionally a telogen and suitable reaction solvent. The anion is preferably that of a strong acid which is non- or weakly coordinating to the transition metal source for dicationic catalysts or a borate salt for monocationic complexes. Preferred couterions include tetrafluoroborate, tetraphenylborate, tetrakis(3,5-bis(trifluoromethylphenyl)borate and methyltris(perfluorophenyl)borate.

Suitable chelating ligands consist of bidentate aliphatic or aromatic nitrogen, phosphorus, arsenic or stilbenes which coordinate in a cis geometry on the square planar palladium cation. The preferred choice for the current invention is 1,3-bis(diphenylphosphino)propane.

Synthesis solvents include any coordinating solvent which stabilizes the dication of palladium during preparation and is lost easily during the polymerization reaction. Suitable solvents include aromatic and aliphatic nitrites, ethers and amines. Cyclic amines such as pyridine may also be employed. The preferred solvent for the current invention is acetonitrile.

The polymerization composition generally consists of a dication or monocation of Pd(II), a reaction solvent and optionally a telogen in the case of dicationic systems. The Pd(II) dication is composed of the components described above. The reaction solvent is generally a solvent which does not coordinate significantly to the transition metal source so as to compete with olefin or carbon monoxide for coordination. It must also serve to dissolve and keep the catalyst in solution during the polymerization reaction. Some solvents which weakly coordinate to the catalyst may result in directing polymer tacticity during the polymerization for $C_3$ and higher olefins. Preferred solvents for the preparation of amorphous and atactic copolymers of one or more alpha olefins with carbon monoxide include dichloromethane, chloroform, 1,2-dichloroethane, ortho-dichlorobenze and hydrocarbons such as toluene. Solvents which may increase polymer tacticity due to coordination effects, particularly when used with very weakly or non-coordinating anions include acetone, methylethylketone and other similar such solvents. Nonsolvents including water can be contemplated for producing the polymers of this invention.

The polymerization process for preparing amorphous to semicrystalline polymers involves contacting under pressure a Pd(II) salt, the preferred salts are [bis(acetonitrile) palladium(II) 1,3-bis(diphenylphosphino)propane)] [tetrafluoroborate], and [methylpalladium(II)1,3-bis (diphenylphosphino)-propane)] [methyltris (pentafluorophenyl)borate] an inert solvent, 1,2-dichloroethane is preferred, optionally, a telogen (telogens are required for dicationic systems, but can poison monocationic systems), methanol is preferred, carbon monoxide, and propylene. Ethylene may be added to increase polymer crystallinity. Suitably, other branched olefins may be added with propylene to decrease polymer crystallinity, these include, for example, 1-butene, 4-methyl-1-pentene, 1-hexene, 1-heptene, 1-octene and 1-decene. Increasing the molecular weight of the monomer increases the difficulty in removing unreacted amounts from the product.

The polymerization reaction can be conducted at a temperature below or above room temperature, however, should not exceed 100° C. as significant catalyst decomposition can occur. Temperature can also impact the properties of the polymer. For example, increasing the temperature at which the polymer is prepared will lower the molecular weight of the polymer and decrease tacticity under conditions which lead to tactic products. Hydrogen may also be added to the reaction mixture in order to control the molecular weight of the product.

Reactors which are suitable for slurry or solution type polymerizations are suitable for the preparation of the polymers of the current invention. A CSTR (continuous stirred tank reactor) can be used for the preparation of the polymers in the current invention. Series reactors may be employed to increase conversion operating in continuous, batch or semi-batch modes. The polymers described in the current invention are prepared in a 0.5 L cylindrical stirred tank reactor under semi-batch conditions. Propylene and/or ethylene are added to the vessel which is charged with catalyst, optionally a telogen and solvent. Alternatively, the olefin(s) and carbon monoxide can be continuously added to the reactor as a blend of gases. The mixture is brought to the desired reaction temperature then charged with carbon monoxide. Carbon monoxide is continuously made-up during the course of the reaction. The reaction is terminated by releasing the pressure and collecting product. Total reaction pressure is generally maintained between 750 and 1500 psig. Pressures below 750 psig generally do not produce significant rates of reaction. Preferred reaction temperatures range from 20 to 50° C. The duration of the reaction depends on the concentration of the catalyst component, relative monomer ratio and temperature. Higher concentrations of catalyst generally give faster rates of reaction, higher concentration of $C_3$ and larger monomers give lower reaction rates (compared to ethylene) and higher temperatures give higher initial rates of reaction with lower catalyst life times provided that catalyst deactivation rate is not significant.

Dicationic catalysts employed in the current invention for the preparation of polyketones may be prepared by two routes: 1) Direct oxidation of palladium metal with the nitrosonium salt of the appropriate borate or 2) By a metathesis route using the silver or alkali salt of the desired counterion with palladium dihalide. Alternatively, a salt such as palladium acetate, may exchange counterions with a strong acid to produce the appropriate Pd(II) salt. Reactions are performed in a suitable solvent which forms a solvate with the Pd(II) salt and stabilizes it. A bidentate chelating ligand is added by direct displacement of two solvate molecules from the transition metal site. Preferred ligands occupy a cis geometry in the Pd(II) square plane.

Monocationic catalysts in the current invention for the preparation of polyketones may be prepared by reacting a palladium dihalide stabilized by a ligand such as 1,5-cyclooctadiene or N,N,N',N'-tetramethylethylene diamine with an alkyl salt such as methyllithium. A bidentate ligand is added by direct displacement of the stabilizing ligand. Preferred ligands occupy a cis geometry in the palladium(II) square plane. The dialkyl palladium(II) complex bearing a bidentate ligand is activated immediately prior to employment in the polymerization reaction by contacting it with a borane.

Although the polymers of this invention can be utilized directly if the molecular weight is low enough for hot melt processing, it is expected that formulated versions will be employed for optimum performance. Additives include but are not limited to tackifiers, oils, plasticizers, waxes, fillers and the like. Tackifiers include natural resins, rosin esters, hydrogenated resins, wood rosins, aromatic modified hydrocarbon resins, polyterpenes, glycerol esters of fumaric-modified resins, coumarone-indene resins, atactic polypropylene, polybutenes, aliphatic hydrocarbon resins, and the like. Plasticizers which should be miscible with the polymers of this invention include the typical PVC plasticizers such as dioctyl phthalate, triphenyl phosphate esters, adipates based on adipic acid, benzoate esters, ester reaction products based on acids or acid anhydrides with alcohols, chlorinated paraffins, epoxidized soybean oil, and the like. Waxes would include paraffin wax, microcrystalline wax, beeswax, polyethylene wax Fischer-Tropsch waxes and the like. Adhesion promoters such as silane coupling agents and titanate coupling agents can be employed to improve the adhesion bonding to various substrates and provide improved water resistance. Additionally the polymers of this invention can be combined in blends with other polymers typically employed for hot melt adhesives including ethylene copolymers such as ethylene/vinyl acetate copolymers, ethylene/acrylic acid copolymers, polyamide hot melt adhesives, polyester hot melt adhesives, styrene-diene-styrene ABA block copolymers and their hydrogenated versions. Fillers can be added to improve creep, lower cost, modify viscosity and would include calcium carbonate, titanium dioxide, talc, silica, wollastonite, carbon black, zinc oxide, fiberglass, attapulgus clay, kaolin clay, diatomaceous earth, alumina trihydrate, barium sulfate, feldspar, and the like. Other non-hot melt polymeric additives can be incorporated with the polymers of this invention including polyolefins such as polyethylene (VLDPE, LDPE, LLDPE, HDPE), polypropylene, ethylene/propylene rubber, natural rubber, styrene/butadiene rubber, polyisobutylene, poly (vinyl acetate), poly(vinyl chloride), poly(ethylene oxide), polystyrene, poly(methyl methacrylate), poly($\epsilon$-caprolactone), polyurethanes, and the like.

The hot melt adhesive of this invention can be employed as an adhesive for a multitude of adhesive applications including polyolefin film bonding, wood bonding, metal bonding, ceramic bonding, paper/cardboard bonding, nonwoven bonding, bonding of various films, including polypropylene, poly(ethylene terephthalate), and the like. The broad adhesive characteristics of the polymers of this invention will be particularly useful for bonding different substrates (i.e., plastic/wood; paper/plastic; wood/metal; film/paper, and the like).

Thermal stabilizers, UV stabilizers, and antioxidants can be added to the olefin/CO linear alternating copolymers of this invention. Specific stabilizers include aromatic carbodiimides, calcium hydroxyapatite, polyepoxides, such as diglycidyl ether of Bisphenol A, hindered phenols, phosphites, and the like.

The following examples are presented to better illustrate the present invention and are not meant to be limiting.

Experimental.

All catalyst complexes were prepared under dry nitrogen (Air Products and Chemicals, Inc. cryogenic boil-off) which was used without further purification. Palladium metal, anhydrous acetonitrile, nitrosonium tetrafluoroborate, 1,3-bis(diphenylphosphino)propane, palladium dichloride, silver trifluoromethanesulfonate, (N,N,N',N'-tetramethylethylenediamine) palladium(II) chloride, methyllithium (substantially salt-free, 1.4M in diethyl ether), sodium sulfate, and activated carbon were purchased from Aldrich Chemical Company and used without further purification. Hexane, diethyl ether, 1-octene, 1-hexene, and 4-methyl-1-pentene were purchased from Aldrich Chemical Company and further purified by distillation from Na/K alloy. Ethylene, propylene, hydrogen, carbon monoxide, and nitrogen were obtained from Air Products and Chemicals, Inc. Acetone, dichloromethane, 1,2-dichloroethane and methanol were obtained from EM Science. Tris(perfluorophenyl)borane was purchased from Quantum Concepts, Austin, Tex., and used without further purification.

EXAMPLE 1

Catalyst Preparation—Preparation of [Bis(acetonitrile)palladium(II)1,3-bis(diphenylphosphino)propane]tetrafluoroborate

[Tetrakis(acetonitrile)palladium(II)]tetrafluoroborate is prepared by a procedure similar to that reported by Wayland, and coworkers, *Chem. Commun.* (1968) 898–899. Palladium metal (Aldrich, powder), 595 mg (5.59 mmole), was weighed into a 250 mL Schlenk flask in a dry box then transferred to a vacuum/nitrogen synthesis line. The metal was slurried in acetonitrile, 30 mL. Nitrosonium tetrafluoroborate, 1.437 (12.30 mmole), was weighed in a dry box into a 100 mL Schlenk then transferred to a vacuum/nitrogen synthesis line. Acetonitrile, 30 mL, was added which dissolved the powder. This was transferred via canula to the 250 mL Schlenk (magnetically stirred) via canula resulting in immediate formation of a green color. An additional 30 mL of acetonitrile was used to rinse the 100 mL flask which was also transferred via cannula to the reaction mixture. The mixture was allowed to stir overnight at room temperature leaving a trace of metal and green solution. [Bis(acetonitrile)palladium(II) 1,3-bis(diphenylphosphino)propane]tetrafluoroborate is prepared by a procedure similar to that reported by Chein and coworkers. 1,3-bis(diphenylphosphino)propane (DPPP), 2.536 g (6.15 mmole), was weighed in a dry box into a 250 mL Schlenk then transferred to a vacuum/nitrogen synthesis line. The powder was slurried in approximately 30 mL of acetonitrile. The product from the reaction of $NOBF_4$ with Pd was directly filtered in the flask containing DPPP. The mixture was stirred at room temperature approximately 3 hours. Some precipitate remained in the mixture upon settling. The solution was filtered from the powder which was discarded. All volatiles were removed under vacuum leaving a light yellow powder. The powder was washed with hexane, 2×50 mL then vacuum dried. A total of 3.465g (4.49 mmole, 80% based on Pd) of product was recovered.

EXAMPLE 2

Catalyst Preparation—Preparation of [Bis(acetonitrile)palladium(II)1,3-bis(diphenylphosphino)propane] trifluoromethylsulfonate The complex was prepared by a procedure similar to that reported in U.S. Pat. No. 5,554,777. Palladium dichloride (Aldrich), 1.010 g (5.696 mmole), was weighed in a glove box under dry nitrogen into a 500 mL Schlenk flask then transferred to a vacuum/nitrogen synthesis line. Silver trifluoromethylsulfonate, 3.220 g (12.53 mmole) was weighed in a glove box into a 250 mL Schlenk flask then transferred to the vacuum/nitrogen synthesis line. Anhydrous acetonitrile (Aldrich), 75 mL, was added via canula to each flask. The contents of both were stirred magnetically throughout the procedure. The solution of silver trifluoromethylsulfonate was added via canula to the slurry of palladium dichloride resulting in rapid formation of a yellow solution over white salts. Contents of the flask were stirred overnight at room temperature. A 250 mL Schlenk flask was charged in a glove box with 1,3-bis(diphenylphosphino)propane (DPPP) (Aldrich), 2.584 g (6.26 mmole), then transferred to the nitrogen/vacuum synthesis line. Acetonitrile, 30 mL, was added to the flask via canula, the mixture was stirred magnetically throughout the procedure. The product if the reaction of palladium dichloride with silver trifluoromethanesulfonate was filtered directly into the flask containing DPPP. A solution formed immediately, however, increasing levels of precipitate formation was noted as the reaction progressed. The mixture was stirred approximately 4 hours at room temperature during which time significant amounts of an off-white precipitate formed. The solution phase was filtered into a dry 250 mL Schlenk then all volatiles were removed under vacuum. The result faint yellow power was washed with hexane, 1×30 mL then 2×40–5 mL. A powder was obtained which was vacuum dried at room temperature for several hours. A total of 3.896 g (4.33 mmole, 76%) of product was recovered.

EXAMPLE 3

Catalyst Preparation—Preparation of [dimethylpalladium(II){1,3-bis(diphenylphosphino)propane}]

(N,N,N',N'-tetramethylethylenediamine)palladium(II) chloride (Aldrich Chemical Company), 10001 mg (3.41 mmole), is weighed in a glove box under dry nitrogen into a 100 mL Schlenk flask equipped with a magnetic stir bar. The flask is transferred to a vacuum/nitrogen synthesis line and diethyl ether, 50 mL, is added. Contents of the flask are cooled to −30° C. in a dry ice/acetone bath and held there for the next step. Methyllithium, 4.34 mL of a 1.65M solution (Aldrich salt free), is transferred slowly via syringe to the mixture. The contents of the flask are allowed to slowly warm to room temperature while stirring. The flask is held at about 0° C. for 45 minutes giving a red-black color. To the flask is added 20 mL of nitrogen degassed deionized water and stirring is stopped. Contents are allowed to settle giving a clear ether layer over a black aqueous suspension. The ether layer is transferred via canula to a 250 mL Schlenk containing anhydrous sodium sulfate (about 10 g). The aqueous layer is extracted with diethyl ether, 3×10 mL, and combined in the 250 mL Schienk. The extracts are filtered into a clean 250 mL flask then all volatiles are removed under vacuum at 0° C. A white powder is obtained which is dried under vacuum then transferred to a glove box freezer held at −20° C. A total of 514 mg is recovered.

The above product, 514 g (2.02 mmole), is weighed in a glove box under dry nitrogen into a 100 mL Schlenk flask then transferred to a vacuum/nitrogen synthesis line. A 100 mL Schlenk is charged in a glove box with 1,3-bis (diphenylphosphino)propane (Aldrich Chemical Company), 957 mg (2.32 mmole), and transferred to the synthesis line. The flask containing Pd is placed in an ice bath and the powder is dissolved in about 3 mL of reagent grade nitrogen degassed acetone. 1,3-Bis(diphenylphosphino)propane is dissolved in about 5 mL of acetone. This is then layered carefully on top of the Pd complex via canula. White crystals form after about 30 minutes. This is allowed to sit for approximately 5 hours at 0° C. undisturbed prior to decanting-off the acetone. The remaining white crystalline solid is washed with hexane, 2×5–10 mL. The product is vacuum dried. A total of 948 mg of [dimethylpalladium(II) {1,3-bis(diphenylphosphino)propane}] is recovered. The product is stored in a glove box under dry nitrogen at −20° C.

Preparation of Propylene/Carbon Monoxide and Ethylene/Propylene|Carbon Monoxide Copolymers A 0.5 L stainless steel (316-SS) reactor consisting of a stacked arrangement of three impeller blades (4–45° pitched impellers) and equipped with an internal cooling coil was used for the polymerization reactions. The reactor was custom built to specification by PDC, Warminster, Pa. Temperature was controlled by two independent PID (proportional-integral-derivative) controllers operating an outside jacket heater (electrically driven) and the internal cooling coil proportional supply valve which controlled the rate of coolant flow through the internal coil. A common setpoint was fed to each controller. The reactor was charged with catalyst, a telogen in the case of dicationic systems, and solvent by separating the head from the body and directly adding each component to the vessel. It was then assembled and purged with nitrogen followed by either ethylene or propylene purging depending on the desired reaction composition. Optionally, for some examples, catalyst and solvent was introduced under nitrogen through a catalyst addition vessel. Olefins were next added to a desired pressure for each component followed by heating to setpoint. Stirring was maintained by a magnetically driven agitator for the duration of the reaction. The duration of each reaction was noted, product was collected through a bottom gate valve or by removal from the top by separating the head and body of the reactor. The order of monomer addition was according to the relative vapor pressure of each component from lowest to highest, i.e., propylene<ethylene<carbon monoxide.

EXAMPLE 4

Preparation of PCO (propylene/carbon monoxide)

The 0.5 liter reactor was charged with 1,2-dichloroethane, 250 mL, methanol, 10 mL and Ex. 1, 250 mg (0.32 mmole). The vessel was assembled and pressure tested then charged as follows: enough propylene was added to give a pressure of 148 psig at 12° C., then carbon monoxide to give a total pressure of 1091 psig at 21° C. Carbon monoxide was made-up during the course of the run by a demand feed regulator. Contents were heated to a setpoint of 30° C. and stirred at 1250 rpm for a total of 22 hours and 40 minutes prior to venting and collecting the product. A soluble polymer was obtained which was vacuum dried and used without further purification. Aproximately 20 g of polymer was obtained.

EXAMPLE 5

Preparation of PCO

The 0.5 liter reactor was charged with 1,2-dichloroethane, 250 mL, methanol, 10 mL and Ex. 1, 149 mg (0.19 mmole). The vessel was assembled and pressure tested then charged as follows: enough propylene was added to give a pressure of 151 psig at 12° C., then carbon monoxide to give a total pressure of 986 psig at 29° C. Carbon monoxide was made-up during the course of the run by a demand feed regulator. Contents were heated to a setpoint of 30° C. and stirred at 1250 rpm for a total for 19 hours prior to venting and collecting the product. A soluble polymer was obtained which as stirred with activated carbon (approximately 5 g) to remove excess color. The soluble polymer was filtered and vacuum dried at 80° C. for 4 hours. A total of 21.60 g of polymer was recovered.

EXAMPLE 6

Preparation of EPCO (ethylene/propylene|carbon monoxide).

The 0.5 liter reactor was charged with 1,2-dichloroethane, 250 mL, methanol, 10 mL and Ex. 1, 100 mg (0.13 mmole). The vessel was assembled and pressure tested then charged as follows: enough propylene was added to give a pressure of 136 psig at 26° C., enough ethylene to give a combined propylene/ethylene pressure of 225 psig at 27° C. then carbon monoxide to give a total reactor pressure of 1008 psig at 29° C. Carbon monoxide was made-up during the course of the run by a demand feed regulator. Contents were heated to a setpoint of 30° C. and stirred at 1250 rpm for a total for 4 hours and 32 minutes prior to venting and collecting the product. The product appeared soluble in the reaction solvent. The sample was initially air dried then redissolved in 1,2-dichloroethane, 300 mL. Approximately 2 to 3 grams of activated carbon was added to the polymer solution which was stirred then filtered with heating. The flask was rinsed with two additional aliquots of 1,2-dichloroethane, 300 mL, to extract any remaining polymer. The combined extracts were air dried for several days prior to evaluation. Approximately 11 g of polymer was obtained.

EXAMPLE 7

Preparation of POCO (propylene/1-octene/carbon monoxide).

The 0.5 liter reactor was charged with 1,2-dichloroethane, 200 mL, methanol, 20 mL, 1-octene, 50 mL, and Ex. 1, 100 mg (0.13 mmole). The vessel was assembled and pressure tested then charged as follows: enough propylene was added to give a pressure of 124 psig at 18° C. Carbon monoxide was added to give and maintain a pressure of approximately 1000 psig. Carbon monoxide was made-up during the course of the run by a demand feed regulator. Contents were heated to a setpoint of 30° C. and stirred at 1250 rpm for a total of 21 hours and 35 minutes. The product appeared soluble in the reaction solvent. All volatiles were evaporated under nitrogen streaming at room temperature in order to determine if a product had been obtained. The remaining residue was redissolved in 1,2-dichloroethane, 200 mL, then treated with 3 g of activated alumina. The mixture was filtered and solvent was evaporated by nitrogen streaming. The polymer sheet was further dried under vacuum at 60° C. for 24 hours. A total of 10.910 g of polymer was recovered.

EXAMPLE 8

Preparation of PCO

The 0.5 liter reactor was charged with 1,2-dichloroethane, 200 mL, methanol, 10 mL and Ex. 1, 100 mg (0.13 mmole). The reactor was assembled, pressure tested, and then charged as follows: enough propylene was added to give a pressure of 131 psig at 18° C., enough carbon monoxide to give a combined pressure of 1046 psig at 22° C. Contents were heated to a setpoint of 30° C. and stirred at 1250 rpm for a total of 16 hours and 15 minutes prior to venting and collecting the product. The product was soluble and treated with activated carbon in order to remove colored impurities. Approximately 300 mL of additional 1,2-dichloroethane was added and the mixture was stirred several minutes. The product was filtered 4 times through filter paper in a Buchner funnel in order to remove all traces of carbon. Some very fine particles remained. Solvent was allowed to evaporated then the product was dried in a vacuum oven for approximately 8 hours at 80° C. A total of 23.095 g of polymer was recovered.

EXAMPLE 9

Preparation of PMPCO (propylene/4-methyl-1-pentene/carbon monoxide).

The 0.5 liter reactor was charged with 1,2-dichloroethane, 200 mL, methanol, 20 mL, 4-methyl-1-pentene, 25 mL, and Ex. 1, 100 mg (0.13 mmole). The reactor was assembled and pressure tested then charged as follows: enough propylene to give a pressure of 133 psig at 22° C., enough carbon monoxide to give a combined pressure of 1000 psig at 30° C. Contents were heated to a setpoint of 30° C. and stirred at 1250 rpm for a total of 21 and 50 minutes prior to venting and collecting the product. The product appeared soluble in the reaction solvent. The dissolved product was treated with 3 g of activated alumina. The mixture was filtered and solvent was evaporated by nitrogen streaming. The polymer sheet was further dried under vacuum at 60° C. for 24 hours. A total of 14.084 g of polymer was recovered.

EXAMPLE 10

Preparation of PHCO (proylene/1-hexene/carbon monoxide).

The 0.5 liter reactor was charged with 1,2-dichloroethane, 200 mL, methanol, 20 mL, 1-hexene, 50 mL, and Ex. 1, 100 mg (0.13 mmole). The reactor was assembled and pressure tested then charged as follows: enough propylene to give a pressure of 131 psig at 19° C., enough carbon monoxide to give a combined pressure of 1000 psig at 30° C. Contents were heated to a setpoint of 30° C. and stirred at 1250 rpm for a total of 24 hours prior to venting and collecting the product. The product appeared soluble in the reaction solvent. The dissolved product was treated with approximately 3 g of activated alumina. The mixture was filtered and solvent was evaporated by nitrogen streaming. The polymer sheet was further dried under vacuum at 60° C. for 24 hours. A total of 11.358 g of polymer was recovered.

EXAMPLE 11

Preparation of ECO (ethylene/carbon monoxide).

The 0.5 liter reactor was charged with acetone, 200 mL, methanol, 50 mL and Ex. 2, 150 mg (0.17 mmole). The reactor was assembled and pressure tested then charged as follows: enough ethylene was added to give a pressure of 272 psig at 25° C., enough carbon monoxide to give a combined pressure of 1000 psig at 50° C. Contents were heated to a setpoint of 50° C. and stirred at 1000 rpm for 3 hours and 15 minutes prior to venting the pressure. The reactor was vented and opened in order to collect the product. An insoluble polymer was obtained which was air dried then acetone, 600 ml, was added and the mixture was transferred to an industrial grade air driven Waring Blender to homogenize the product and grind into a fine powder. The product was filtered through filter paper in a Buchner funnel then rinsed with an additional 400 mL of acetone. The polymer was air dried then vacuum dried between 60 and 80° C. for several hours. A total of 37.620 g of product was recovered.

EXAMPLE 12

Preparation of EPCO.

The 0.5 liter reactor was charged with 1,2-dichloroethane, 250 mL, methanol, 10 mL, and Ex. 1, 100 mg (0.13 mmole). The reactor was assembled and pressure tested then charged as follows: enough propylene was added to give a pressure of 126 psig, enough ethylene was added to give a combined pressure of 220 psig, enough carbon monoxide was added to give a total pressure of 1000 psig. Contents of the reactor were heated to a setpoint of 30° C. and stirred at 1250 rpm prior to venting the reactor. An insoluble polymer was obtained which was collected by opening the reactor.

Sample was split for several analytical trials prior to drying, thus a total dry weight was not obtained. All samples were vacuum dried prior to analysis.

EXAMPLE 13

Preparation of EPCO

The 0.5 liter reactor was charged with 1,2-dichloroethane, 250 mL, methanol, 10 mL, and Ex. 1, 100 mg (0.13 mmole). The reactor was assembled and pressure tested then charged as follows: enough propylene was added to give a pressure of 143 psig at 20° C., enough ethylene to give a combined pressure of 359 psig at 20° C., enough carbon monoxide to give a combined pressure of 1000 psig at 30° C. Contents of the reactor were heated to a setpoint of 30° C. and stirred at 1250 rpm for 3 hours and 48 minutes prior to venting the reactor. A semi-soluble to gelatinous material was obtained which was collected by opening the reactor. Solvent was evaporated under nitrogen streaming and the polymer was dried under vacuum for several hours at 60° C. A total of 16.949 g of sample was recovered (note: some material was removed for testing prior to obtaining a final weight).

EXAMPLE 14

Preparation of EPCO

The 0.5 liter reactor was charged with 1,2-dichloroethane, 200 mL, methanol, 10 mL, and Ex. 1, 50 mg (0.07 mmole). The reactor was assembled and pressure tested the charged as follows: enough propylene was added to give a pressure of 47 psig at 20° C., enough ethylene to give a combined pressure of 247 psig at 20° C., enough carbon monoxide to give a combined pressure of 1000 psig at 30° C. Contents of the reactor were heated to a setpoint of 30° C. and stirred at 1250 rpm for 4 hours and 25 minutes prior to venting. A spongy solvent swollen polymer was obtained which was removed by opening the reactor. Solvent was evaporated by nitrogen streaming. The solid was washed by addition of acetone, 600 ml, then the mixture was transferred to an industrial grade air driven Waring Blender to homogenize the product and grind into a fine powder. The product was filtered through filter paper in a Buchner funnel then rinsed with an additional 400 mL of acetone. The powder was air dried then vacuum dried several hours at 60° C. in a vacuum oven. A total of 16.615 g was recovered.

EXAMPLE 15

Preparation of EPCO

The 0.5 liter reactor was charged with 1,2-dichloroethane, 250 mL, methanol, 10 mL, and Ex. 1, 100 mg (0.13 mmole). The reactor was assembled and pressure tested then charged as follows: enough propylene was added to give a pressure of 121 psig at 30° C., enough ethylene was added to give a combined pressure of 216 psig at 30° C., enough carbon monoxide was added to give a combined pressure of 1008 psig at 30° C. Contents of the reactor were heated to a setpoint of 30° C. and stirred at 1250 rpm for 11 hours and 40 minutes prior to venting. A thick almost soluble or swollen material was obtained. Solvent was evaporated by nitrogen streaming. The polymer was then dried in a vacuum oven at 80° C. for several hours. Heating the sample to between 80 and 100° C. resulted in formation of a yellow color in the resin. The sample was extracted with warm acetone (5×400 mL) which removed the yellow color. Sample was dried in a vacuum oven prior to use.

EXAMPLE 16

Preparation of EPCO

The 0.5 liter reactor was charged with 1,2-dichloroethane, 250 mL, methanol, 10 mL, and Ex. 1, 100 mg (0.13 mmole). The reactor was assembled and pressure tested then charged as follow: enough propylene to give a pressure of 132 psig at 30° C., enough ethylene to give a combined pressure of 220 psig at 30° C., enough carbon monoxide to give a combined pressure of 1000 psig at 30° C. Contents for the reactor were heated to a setpoint of 30° C. and stirred at 1250 rpm for 20 hours and 55 minutes prior to venting. Product was collected and the solvent was evaporated by nitrogen purging. The sample was vacuum dried at 80° C. for several hours then extracted with acetone which gelled it (3×400 mL) and was precipitated from solution by adding hexane (3×300 mL). The extracted sample was vacuum dried for several hours at 80° C. A total of 34.312 g of product was recovered.

EXAMPLE 17

Preparation of EPCO

The 0.5 liter reactor was charged with 1,2-dichloroethane, 250 mL, methanol, 10 mL, and Ex. 1, 100 mg (0.13 mmole). The reactor was assembled and pressure tested then charged as follows: enough propylene to give a pressure of 128 psig at 30° C., enough ethylene to give a combined pressure of 224 psig at 30° C., enough hydrogen to give a combined pressure of 298 psig, enough carbon monoxide to give a combined pressure of 1000 psig at 30° C. Contents of the reactor were heated to a setpoint of 30° C. and stirred at 1250 rpm for 18 hours and 15 minutes prior to venting. Solvent was evaporated by nitrogen streaming then the solid was vacuum dried several hours at 80° C.

EXAMPLE 18

Activation of Ex. 3 with tris(perfluorophenyl) borane:

A 100 mL Schlenk flask was charged in a glove box with Ex. 3, 100 mg (0.18 mmole) and a separate 100 mL Schlenk flask was charged with tris(perfluorophenyl)borane, 103 mg (0.20 mmole). Both flasks were transferred to a nitrogen synthesis line. The flask containing Ex. 3 was cooled in a dry ice/acetone bath to −20° C. To each flask was added 5–10 mL of anhydrous methylene chloride (Aldrich). The mixtures were combined and stirred at −20 to −25° C. for a few minutes. A yellow solution was obtained which was immediately transferred to a precharged reactor.

A 0.5 L reactor was charged with dichloromethane, 190 mL. The system was purged with propylene then enough propylene was added to give a pressure of 138 psig at 13° C. Contents were heated to a setpoint of 25° C. while stirring at 1250 rpm. Enough carbon monoxide was added to give a total pressure of 1021 psig at 24° C. The catalyst solution above was added to the reactor through a nitrogen padded catalyst addition vessel fitted with a dip tube penetrating the solution level. Carbon monoxide was continuously made up during the course of the reaction which was allowed to continue for 23 hours. A viscous yellow solution was obtained which was dried to a film. The polymer was dissolved in warm acetone, 25 mL. To this was added approximately 250 mL of methanol which precipitated a white solid. The catalyst color was removed from the polymer. The film was dried and approximately 5.6 g of polymer was recovered.

EXAMPLE 19

Activation of Ex. 3 with tris(perfluorophenyl) borane:

A 100 mL Schlenk flask was charged in a glove box with Ex. 3, 100 mg (0.18 mmole) and a separate 100 mL Schlenk flask was charged with tris(perfluorophenyl)borane, 103 mg (0.20 mmole). Both flasks were transferred to a nitrogen synthesis line. The flask containing Ex. 3 was cooled in a dry ice/acetone bath to −20° C. To each flask was added 5–10 mL of anhydrous methylene chloride (Aldrich). The mixtures were combined and stirred at −20 to −25° C. for a few minutes. A yellow solution was obtained which was immediately transferred to a precharged reactor.

A 0.5 L reactor was charged with dichloromethane, 100 mL. Enough propylene was added to give a pressure of 28 psig at 22° C. followed by enough carbon monoxide to give a total pressure of 94 psig at 15° C. The catalyst solution above was added to the reactor through a nitrogen padded catalyst addition vessel fitted with a dip tube penetrating the solution level and the mixture was stirred approximately 1 minute. An additional 100 mL of methylene chloride was added to the reactor under nitrogen through the catalyst addition vessel. The reactor was vented to atmospheric pressure then charged with enough propylene to give a pressure of 152 psig at 13° C. followed by enough carbon monoxide to give a total pressure of 1020 psig at 25° C. Carbon monoxide was continuously made up during the reaction. The reaction was conducted overnight. A viscous solution was obtained which was evaporated yielding a polymer film. The film was washed with several volumes of methanol then dried 12 hours at 50° C. under a vacuum while purging with nitrogen. A dry weight of 24.914 g was obtained.

EXAMPLE 20

Activation of Ex. 3 with tris(perfluorophenyl) borane:

A 100 mL Schlenk flask was charged in a glove box with Ex. 3, 100 mg (0.18 mmole) and a separate 100 mL Schlenk flask was charged with tris(perfluorophenyl)borane, 103 mg (0.20 mmole). Both flasks were transferred to a nitrogen synthesis line. The flask containing Ex. 3 was cooled in a dry ice/acetone bath to −20° C. To each flask was added 5–10 mL of anhydrous methylene chloride (Aldrich). The mixtures were combined and stirred at −20 to −25° C. for a few minutes. A yellow solution was obtained which was immediately transferred to a precharged reactor.

A 0.5 L reactor was charged with dichloromethane, 100 mL then enough propylene to give a pressure of 43 psig at 15° C. followed by enough carbon monoxide to give a total pressure of 105 psig at 14° C. The catalyst solution above was added to the reactor through a nitrogen padded catalyst addition vessel fitted with a dip tube penetrating the solution level and the mixture was stirred approximately 1 minute. An additional 100 mL charged of methylene chloride was added via the catalyst addition vessel under nitrogen. The reactor was vented after stirring approximately one minute then charged with propylene, 132 psig at 13° C. followed by enough hydrogen to give a total pressure of 142 psig at 13° C. Carbon monoxide was added to give a total pressure of 984 psig at 24° C. The setpoint was held at 25° C. and the agitator was maintained at 1250 rpm. The polymerization was conducted approximately 24 hours prior to isolating a viscous solution. The polymer was washed with methanol, 4×300 mL, extracting a dark green/yellow solution. The polymer was dried under vacuum at 50° C. for 15 hours. A total of 42.774 g was recovered.

EXAMPLE 21

NMR Evaluation of Selected Polymer Samples.

Samples of ECO and PCO were characterized by nmr spectroscopy in order to determine the composition of selected samples. Ethylene and propylene ratios were established by integrating methylene protons for each monomer and compared by proton nmr. $^{13}$C NMR was also used to verify results obtained from $^1$H NMR with respect to purity and relative monomer ratios incorporated in each polymer. Spectra were obtained at ambient temperature by dissolving samples of each polymer in 1,1,1,3,3,3-hexafluoro-2-propanol(D) then transferring and aliquot to 5 mm tubes. The instrument used was a Bruker ACP-300 FT-NMR spectrometer equipped with a 5 mm QNP probe. All samples were determined to be analytically pure by this method for the linear alternating presence of carbonyl groups. Samples were, therefore, concluded to contain 50 mole % ketone in the structure. The olefin ratios are reported as determined spectroscopically in Table 1 below expressed as a fraction of the total mole percent of the olefin component in the polymer (olefin=100%):

TABLE 1

| Example | % Ethylene | % Propylene |
|---|---|---|
| 6 | 66.6 | 33.4 |
| 8 | 0 | 100 |
| 11 | 100 | 0 |
| 12 | 45.5 | 54.5 |

TABLE 1-continued

| Example | % Ethylene | % Propylene |
|---|---|---|
| 13 | 75.8 | 24.2 |
| 14 | 97.5 | 2.5 |
| 15 | 41.1 | 58.9 |
| 16 | 39.1 | 60.9 |
| 17 | 66.8 | 33.2 |

EXAMPLE 22

Adhesion testing was conducted using the following protocol. Adhesive lap shear specimens were prepared using maplewood, cold-rolled steel and aluminum panel specimens. The maple wood dimensions were 4"×0.750"×0.200". The cold rolled steel dimensions were 4"×1"×036". The aluminum panel dimensions were 4"×1"×0.065". Samples of compression molded specimens (20 mils thick) were cut to prepare lap shear joints. The specimen size corresponded to the overlap area of the joint. For maplewood ¾"×½" squares were utilized; for steel and aluminum and steel 1"×½" squares were used. Both the substrates and the polymer samples were immersed (briefly) in isopropanol and dried with Kimwipe prior to specimen assembly. This was done to remove any mold release present on the polymer surface or oils/contamination on the substrate surfaces. The lap shear joints covering the polymer specimen were held in place (one on each side) by binder clips to provide pressure during the heat exposure step. The samples were placed in a Blue M circulating air oven set at 160° C. for 15 minutes and then removed and allowed to cool at room temperature (23° C.). The samples were then conditioned for 7 days in a constant temperature (23° C.); constant humidity (50%) room. The samples were placed in the jaws of an Instron testing machine and tested at 0.2"/min to failure. The lap shear results on the various materials are listed in Table 2.

TABLE 2

| | LAP SHEAR STRENGTH (psi) | | |
|---|---|---|---|
| Sample Description | Aluminum | Steel | Maplewood |
| EVA (40% VAc) | 53.4 | 192 | 130 |
| Primacor 5981 (EAA) | 700 | 1565 | 1197 |
| Unirez 2645 | 395 | 815 | 1124 |
| Unirez 2665 | 436 | 1933 | 1630 |
| PCO Ex. 4 | 1145 | 1810 | 1624 |
| PCO Ex. 5 | 1071 | 1949 | 1789 |

EXAMPLE 23

The viscosity of the various polymers employed in these adhesives studies was determined using a Rheometrics dynamic mechanical analyzer. Results were obtained at various temperatures and frequencies as noted in Table 3. Samples were compression molded into 20 mil plaques and specimens were die cut for viscosity measurement.

TABLE 3

| Temp. (°C.) | Viscosity (poise) Frequency (rad/sec) | | | |
|---|---|---|---|---|
| | 0.1 | 1.0 | 10 | 100 |
| EVA (40% VAc) | 100 | 64,211 | 46,830 | 23,387 | 9,114 |
| Primacor 5981 | 100 | — | 37,170 | 24,607 | 12,423 |
| PCO Ex. 5 | 100 | 1,126,200 | 246,300 | 55,614 | 11,408 |
| PCO Ex. 4 | 100 | 2150 | 1230 | 831 | 585 |
| PCO Ex. 5/R-100 (70/30) | 100 | 35,081 | 25,996 | 17,141 | 9378 |
| PCO Ex. 5/R-40 (70/30) | 100 | 71,038 | 28,330 | 12,044 | 4194 |
| EVA (40% VAc) | 120 | 28,152 | 23,994 | 13,981 | 6,058 |
| Primacor 5981 | 120 | — | 12,500 | 9,200 | 5,410 |
| PCO Ex. 5 | 120 | 196,420 | 129,080 | 67,960 | 24,927 |
| PCO Ex. 4 | 120 | 226 | 165 | 119 | 102 |
| PCO Ex. 5/R-100 (70/30) | 120 | 8,940 | 5,837 | 4,428 | 2,589 |
| PCO Ex. 5/R-40 (70/30) | 120 | 10,815 | 6,072 | 3,850 | 1,890 |
| EVA (40% VAc) | 150 | 9,130 | 8,632 | 6,311 | 3,228 |
| Primacor 5981 | 150 | — | 2,650 | 2,240 | 1,612 |
| PCO Ex. 5 | 150 | 22,566 | 21,264 | 18,200 | 10,344 |
| PCO Ex. 4 | 150 | 43 | 21 | 16 | 16 |
| PCO Ex. 5/R-100 (70/30) | 150 | 2,060 | 1,036 | 750 | 476 |
| PCO Ex. 5/R-40 (70/30) | 150 | 947 | 718 | 627 | 481 |
| PMPCO Ex. 9 | 150 | 1,653 | 1,595 | 1,578 | 1,409 |
| PHCO Ex. 10 | 150 | 3,061 | 2,921 | 2,851 | 2,344 |
| Unirez 2645 | 150 | 506 | 430 | 426 | 400 |
| Unirez 2665 | 150 | 1,047,600 | 126,990 | 17,553 | 4,173 |
| PCO Ex. 8 | 150 | 425 | 338 | 310 | 284 |
| PCO Ex. 19 | 150 | 8,916 | 8,702 | 8,247 | 6,199 |
| PCO Ex. 20 | 150 | 52,870 | 48,362 | 36,265 | 16,714 |
| EVA (40% VAc) | 180 | 3,540 | 3,472 | 2,985 | 1,800 |
| Primacor 5981 | 180 | — | 737 | 660 | 539 |
| PCO Ex. 5 | 180 | 7,120 | 4,829 | 4,158 | 2,839 |
| Unirez 2645 | 180 | 140 | 123 | 120 | 117 |
| Unirez 2665 | 180 | 197 | 164 | 150 | 141 |
| PCO Ex. 8 | 180 | 99 | 50 | 44 | 42 |
| PMPCO Ex. 9 | 180 | 670 | 602 | 595 | 572 |
| PHCO Ex. 10 | 180 | 1,255 | 1,097 | 1,079 | 997 |
| PCO Ex. 19 | 180 | 6,145 | 6,164 | 5,843 | 4,404 |
| PCO Ex. 20 | 180 | 19,410 | 18,983 | 16,501 | 9,521 |

EXAMPLE 24

Samples of the alternating propylene-carbon monoxide copolymer (Ex. 5) were modified with rosin esters (Uni-Tac R100 and Uni-Tac R40). Uni-Tac R100 is a pentaerythritol ester of rosin with a ring and ball softening point of 95–102° C. and a melt viscosity (Brookfield) of 4100 cps at 140° C. Uni-Tac R40 is a rosin ester with a ring and ball softening point of 30–40° C., and a melt viscosity (Brookfield) of 100 cps at 100° C. Both R40 and R100 were obtained from Union Camp Corporation. Blends with PCO (Example 5) (70 wt % PCO/30 wt % R100 or R40)were made by dissolving the constituents in tetrahydrofuran followed by devolatilization. The samples were then compression molded in a 20 mil cavity mold at 120–130° C. Maplewood adhesive lap shear specimens were made and tested as per the protocol given in Example 9. Melt viscosities are noted above in Table 3. The lap shear strength results are as noted:

70/30 PCO/R100 Maplewood Lap Shear Strength=1503 psi

70/30 PCO/R40 Maplewood Lap Shear Strength=750 psi

EXAMPLE 25

Samples of the lap shear joints on steel (½"×1") were attached vertically in an air circulating oven with 500 gram weights loaded on the bottom of the samples. The time to failure of the specific samples was determined at various time/temperature intervals. Initially the samples were held for two minutes (at 80° C.) prior to loading the 500 grams. The results are noted in Table 4 below:

TABLE 4

| Sample Designation | Temperature | Results |
|---|---|---|
| EVA (40% VAc) | 80° C. | Failure at 26 seconds |
| Primacor 5981 | 80° C. | Failure at 41 minutes 25 seconds |
| PCO Ex. 4 | 80° C. | No failure; 24 hours |
| | 100° C. | Failure at 31 minutes |
| Unirez 2645 | 80° C. | No failure; 24 hours |
| | 100° C. | No failure; 4 hours |
| | 125° C. | Failure at 3 minutes 15 seconds |
| Unirez 2665 | 80° C. | No failure; 24 hours |
| | 100° C. | No failure; 4 hours |
| | 125° C. | No failure; 2 hours |
| | 130° C. | No failure; 2 hours |
| | 135° C. | No failure; 2 hours |
| | 140° C. | Failure at 1 hour and 21 minutes |
| EPCO Ex. 6 | 80° C. | No failure; 24 hours |
| | 100° C. | No failure; 4 hours |
| | 125° C. | No failure; 2 hours |
| | 130° C. | No failure; 2 hours |
| | 135° C. | No failure; 2 hours |
| | 140° C. | No failure; 2 hours |
| | 145° C. | No failure 2 hours |
| | 150° C. | No failure 2 hours |
| | 155° C. | No failure 2 hours |
| | 160° C. | No failure 2 hours |
| | 165° C. | Failure at 1 hour 40 minutes |

EXAMPLE 26

Additional samples of propylene/carbon monoxide copolymers were synthesized and prepared for lap shear testing. These included copolymers where part of the propylene was replaced with ethylene, 1-hexene or 4-methyl-1-pentene. The lap shear samples were prepared as noted in Example 22. The results were obtained after 5 days aging at room temperature in a 50% RH room and are reported in Table 5 below.

TABLE 5

| | Lap Shear Strength (psi) | | |
|---|---|---|---|
| Sample Description | Wood | Aluminum | Steel |
| PCO + 4-methyl-1-pentene Ex. 9 | 1347 | 144 | — |
| PCO + 1-hexene Ex. 10 | 1051 | 216 | 848 |
| PCO Ex. 8 | 1283 | 297 | 1032 |

EXAMPLE 27

In order to expand the comparison, PCO was compared with the best hot melt previously evaluated (Unirez 2665) in steel to aluminum adhesion with lap shear strengths noted in Table 6 below:

TABLE 6

|  | Lap Shear Strength (psi) (Al to Steel) |
|---|---|
| PCO Ex. 4 | 2193 psi |
| Unirez 2665 | 1004 psi |

Samples tested 16 hours after preparation. Joints made at 160° C.; 20 min.

EXAMPLE 28

Calorimetry Characterization:

Samples were obtained in powder form and compression molded into 20 mil plaques. Calorimetric characterization was provided employing a differential scanning calorimeter. The procedure involved cooling a specimen to well below the $T_g$ and heating at a rate of 10° C./ min. up to above the melting point. The temperature rate was reversed and the sample cooled to below the $T_g$ at 10° C./min. The temperature was then raised at 10° C. for the second heating cycle. The glass transition temperature, $T_g$, the heat of fusion, $\Delta H_f$, and the crystallization melting point, $T_m$, were determined for the heating cycles. The $T_g$, the crystallization temperature, $T_c$, and the heat of crystallization, $\Delta H_c$, were determined during the cooling cycle. Tabulated data is listed in Table 7. Several comparisons are readily apparent. ECO copolymers exhibit a very high melting point and a high degree of crystallinity (as judged by the initial heat of fusion). After cooling and reheating, the data for the second scan showed a $T_m$ of 230° C. and a $\Delta H_f$ of 46 J/g. This is in the general range of what is observed for ECO copolymers as noted in Table 7. PCO exhibits a low melting point and a low heat of fusion. However, the crystallinity was not retained after melting and then recooling. The influence of propylene addition on the melting point of ECO is well noted in Table 7.

EXAMPLE 29

Mechanical Properties: Dynamic Mechanical Analysis and Stress-Strain Data.

The dynamic mechanical analysis (DMA) results were obtained on 20 mil compression molded samples. Examples of ECO, EPCO and PCO olefin-alt-carbon monoxide copolymers are noted in Table 8. The temperatures at which the modulus drops below $10^{10}$, $10^9$, $10^8$, $10^7$ and $10^6$ dynes/cm$^2$ are noted to give a comparison of the rigidity of the samples at various temperatures. At higher levels of crystallinity, the modulus crossover temperatures are higher and in some cases the crystallinity is high enough that the modulus does not go lower than some of the limits noted. Note that the higher levels of ethylene results in high crystallinity and the samples tend to crosslink before they can undergo thermoplastic flow as is well noted in the modulus-temperature behavior.

TABLE 8

Dynamic Mechanical Analysis on Olefin-CO Polymers

| | | | | Temperature (° C.) where E' equals | | | | |
|---|---|---|---|---|---|---|---|---|
| Example # | Description | $T_g$ (° C.) | $T_m$ (° C.) | $10^{10}$ | $10^9$ | $10^8$ | $10^7$ | $10^6$ |
| | | | | (dynes/cm$^2$) | | | | |
| 4 | PCO | 30 | 104 | 22 | 28 | 35 | 75 | 95 |
| 7 | POCO | 24 | 66 | 15 | 20 | 22 | 46 | 58 |
| 8 | PCO | 27 | 104 | 16 | 28 | 52 | 87 | 100 |
| 12 | EPCO | 16 | 100 | 10 | 20 | 57 | 81 | 98 |
| 13 | EPCO | 22 | 178 | 16 | 82 | 155 | 166 | |
| 14 | E/P 97.5/2.5 | 52 | 235 | 80 | 248 | | | |
| 15 | EPCO | 24 | | | | | | |
| 16 | EPCO | 24 | | 16 | 23 | 45 | 106 | |
| 18 | PCO* | 32 | 128 | 26 | 33 | 44 | 100 | 123 |
| 19 | PCO* | 32 | 98 | 22 | 27 | 33 | 81 | 94 |
| 20 | PCO* | 32 | 160 | 19 | 28 | 39 | 110 | 148 |
| EVA | 40% VAc | -21 | 68 | -36 | -24 | 0 | 45 | 56 |

*mono-cationic catalyst

EXAMPLE 30

The viscosity of two PCO samples were measured versus time to observe the thermal stability as judged by rheological stability. The dicationic catalyst-prepared PCO exhibited a continuous decrease over~10,000 sec. at 150° C. The monocationic catalyst-prepared PCO gave excellent viscos-

TABLE 7

CALORIMETRY ON EPCO Co- and TERPOLYMERS

| Ex # | Description | Tg (C.) | 1st Heating Heat of fusion J/g | Tm (C.) | Tg (C.) | 1st Cooling Heat of Crystallization J/g | Tc (C.) | Tg (C.) | 2nd Heating Heat of Fusion J/g | Tm (C.) |
|---|---|---|---|---|---|---|---|---|---|---|
| 6 | E/P = 66.6/33.4 | 9.3 | 10.3 | 144 | 6.9 | 8.2 | 99 | 10 | 11.3 | 144.7 |
| 8 | PCO | 16 | 7.1 | 107 | 13.9 | 7 | 75.3 | 18.5 | 10.4 | 106 |
| 11 | ECO | | 145 | 253.6 | 48.3 | | | 47.2 | | |
| 12 | EPCO | 10.1 | 16.4 | 48, 65 | 9 | | | 10.5 | | |
| 13 | EPCO | 12 | 28.3 | 167.1 | 5.4 | 20.3 | 128.9 | 8.9 | 14.3 | 169.9 |
| 14 | E/P = 97.5/2.5 | | 114.6 | 245.5 | | 65.8 | 193.5 | | 53.4 | 224 |
| 15 | EPCO | 15.9 | 3.26; 3.1 | 48.5, 81 | 6.9 | | | 11.7 | | |
| 16 | E/P = 39.1/60.9 | 14.2 | 3.15 | 47.9 | 11.6 | | | 11.8 | | | ity stability over a long time period at a higher temperature. The results were obtained on a Rheometric dynamic mechanical analyzer and are reported in Table 9 below.

TABLE 9

| Time (seconds) | Viscosity (psise) | |
| --- | --- | --- |
| | PCO Ex. 5 dicationic catalyst (150° C.) | PCO Ex. 20 monocationic catalyst (160° C.) |
| 1,000 | 19,380 | 34,332 |
| 2,000 | 19,088 | 34,726 |
| 3,000 | 18,842 | 34,825 |
| 4,000 | 18,597 | 34,863 |
| 5,000 | 18,334 | 34,916 |
| 6,000 | 18,067 | 34,956 |
| 7,000 | 17,751 | 34,920 |
| 8,000 | 17,335 | 34,936 |
| 9,000 | 16,747 | 34,903 |
| 9,600 | 16,232 | — |
| 10,000 | — | 34,894 |
| 11,000 | — | 34,820 |
| 12,000 | — | 34,717 |
| 13,000 | — | 34,520 |
| 14,000 | — | 34,889 |

EXAMPLE 31

Two samples of PCO prepared with monocationic catalysts were evaluated as hot melt adhesives for aluminum, steel, and maplewood using the protocol noted in Example 22. The results are reported in Table 10 below.

TABLE 10

| Sample Designation | PCO (Ex. 19) | PCO (Ex. 20) |
| --- | --- | --- |
| | Lap Shear Strength (psi) | |
| Aluminum | 275 | 280 |
| Steel | 751 | 932 |
| Maplewood | 1,156 | 1,580 |

What is claimed is:

1. A hot melt adhesive formulation having a melting point from 50° C. to 165° C. comprising an olefin/CO linear alternating copolymer wherein at least 54.5 mole % of the olefins in the polymer are -olefins.

2. A hot melt adhesive formulation in accordance with claim 1 wherein said olefin/CO linear alternating copolymer is a propylene/CO copolymer.

3. A hot melt adhesive formulation in accordance with claim 1 wherein said olefin/CO linear alternating copolymer contains both ethylene and propylene groups.

4. A hot melt adhesive formulation in accordance with claim 3 wherein up to 30% of the olefin groups are ethylene.

5. A hot melt adhesive formulation in accordance with claim 1 wherein up to 70% of the olefin groups are $C_4$ to $C_{12}$ olefins.

6. A hot melt adhesive formulation in accordance with claim 5 wherein said higher olefins are selected from the group consisting of 4-methyl-1-pentene, 1-hexene, 1-octene, styrene, and mixtures thereof.

7. A hot melt adhesive formulation in accordance with claim 1 which also comprises components selected from the group consisting of tackifiers, plasticizers, waxes, resins, and mixtures thereof.

8. A hot melt adhesive formulation in accordance with claim 1 which also comprises one or more adhesion promoters.

9. A hot melt adhesive formulation in accordance with claim 8 wherein said adhesion promoter is selected from the group consisting of silane coupling agents, titanate coupling agents, and mixtures thereof.

10. A hot melt adhesive formulation in accordance with claim 1 which also comprises other polymers typically employed for hot melt adhesives.

11. A hot melt adhesive formulation in accordance with claim 10 wherein said additional polymers are selected from the group consisting of ethylene copolymers, polyamide hot melt adhesives, polyester hot melt adhesives, styrene-diene-styrene ABA block copolymers, hydrogenated styrene-diene-styrene ABA block copolymers, and mixtures thereof.

12. A hot melt adhesive formulation in accordance with claim 1 which also comprises one or more non-hot melt polymers.

13. A hot melt adhesive formulation in accordance with claim 12 wherein said non-hot melt polymers are selected from the group consisting of polyolefins, ethylene/propylene rubber, natural rubber, styrene/butadiene rubber, polyisobutylene, poly(vinyl acetate), poly(vinyl chloride), poly(ethylene oxide), polystyrene, poly (methylmethacrylate), poly(ε-caprolactone), polyurethanes, and mixtures thereof.

14. A hot melt adhesive formulation in accordance with claim 1 which is useful for bonding similar or different types of substrates.

15. A hot melt adhesive formulation in accordance with claim 14 wherein said substrates include: polyolefin films, wood, metals, ceramics, paper/cardboard, and nonwoven materials.

\* \* \* \* \*

UNITED STATES PATENT AND TRADEMARK OFFICE
CERTIFICATE OF CORRECTION

PATENT NO. : 6,239,250 B1
DATED : May 29, 2001
INVENTOR(S) : John Guinn Hefner, et al.

It is certified that error appears in the above-identified patent and that said Letters Patent is hereby corrected as shown below:

Column 21,
Line 43, insert -- α -- in front of –olefins.

Signed and Sealed this

Thirteenth Day of November, 2001

Attest:

NICHOLAS P. GODICI
Attesting Officer  Acting Director of the United States Patent and Trademark Office